US007096117B1

(12) United States Patent
Gale et al.

(10) Patent No.: US 7,096,117 B1
(45) Date of Patent: Aug. 22, 2006

(54) METHOD AND SYSTEM OF POLYLINE GENERATION FOR RENDERING A RICHLY ATTRIBUTED REPRESENTATION OF A GEOGRAPHIC REGION

(75) Inventors: William Gale, Oak Park, IL (US); William McDonough, Glen Ellyn, IL (US)

(73) Assignee: Navteq North America, LLC, Chicago, IL (US)

( * ) Notice: Subject to any disclaimer, the term of this patent is extended or adjusted under 35 U.S.C. 154(b) by 319 days.

(21) Appl. No.: 10/760,993

(22) Filed: Jan. 20, 2004

(51) Int. Cl.
*G01C 21/32* (2006.01)
*G06F 7/00* (2006.01)

(52) U.S. Cl. ............... 701/208; 701/212; 707/102; 707/104.1; 340/995.18

(58) Field of Classification Search ............. 701/208, 701/212; 707/102, 104.1; 342/357.13; 340/995.18
See application file for complete search history.

(56) References Cited

U.S. PATENT DOCUMENTS

| 5,953,722 | A   | * | 9/1999  | Lampert et al. ............ 707/100 |
| 5,968,109 | A   |   | 10/1999 | Israni et al. ................ 701/208 |
| 6,038,559 | A   | * | 3/2000  | Ashby et al. ................. 707/4 |
| 6,092,076 | A   |   | 7/2000  | McDonough et al. ........ 707/102 |
| 6,118,404 | A   |   | 9/2000  | Fernekes et al. ........ 342/357.13 |
| 6,163,749 | A   |   | 12/2000 | McDonough et al. ........ 701/208 |
| 6,308,177 | B1  | * | 10/2001 | Israni et al. ................ 707/100 |
| 6,665,676 | B1  | * | 12/2003 | Twig et al. ................... 707/10 |
| 6,782,319 | B1  | * | 8/2004  | McDonough ............... 701/208 |

* cited by examiner

*Primary Examiner*—Thomas G. Black
*Assistant Examiner*—Marie A. Weiskopf
(74) *Attorney, Agent, or Firm*—Grace Law O'Brien; Frank J. Kozak; Jon D. Shutter

(57) ABSTRACT

A method and system of polyline generation for rendering a representation of a geographic region is provided. Within a database containing geographic data, polyline data entities represent geographic features. Each polyline data entity is associated with a drawcode that defines attributes of the data entity, and organized within the database based on the drawcode. During a rendering process, a processor can read a group of data from a database stored on a disc that is organized to contain all polyline data entities associated with the same drawcode. The processor can then render all geographic features in an area that are similar using one or a minimum number of disc reads.

46 Claims, 12 Drawing Sheets

METHOD AND SYSTEM OF POLYLINE GENERATION FOR RENDERING A RICHLY ATTRIBUTED REPRESENTATION OF A GEOGRAPHIC REGION

FIELD OF INVENTION

The present invention relates to a system and method for rendering representations of geographic features in a region on a display of a computer platform, such as a navigation system.

BACKGROUND

Computer-based navigation systems for use on land have become available in a variety of forms and provide a variety of useful features. These types of navigation systems use databases that represent geographic features, such as roads, in a region. A navigation system can use the data to display maps for in-vehicle navigation, for example. The data used by a navigation system may provide a model of a road/street network with depth, accuracy and coverage to enable turn-by-turn route guidance, or to help a user find locations of specific restaurants, hotels, airports, and shopping centers, for example. Other useful features may include map display functions, vehicle positioning functions, and destination resolution capabilities, for example.

When performing a map display function with a navigation system, the sizes, shapes, and relative positions of geographic features in a portion of a geographic region are portrayed on a display associated with the navigation system. The geographic features being displayed may include roads, intersections, and points-of-interest, as well as other features, such as lakes, railroad tracks, buildings, airports, stadiums, parks, mountain ranges, docks, ferries, tunnels, and bridges, for example. To provide this map display function, geographic data includes information that allows the navigation system to display the size, shape, position, and character of these various geographic features on the display associated with the navigation system.

Traditional paper maps use different colors, different kinds of lines (e.g., solid, dashed, dotted, etc.) and lines of different widths to depict different geographic features and different types of certain geographic features. For example, paved roads may be depicted with solid lines and unpaved road may be depicted with dashed lines. Similarly, controlled access roads may be depicted with wide, red lines and narrow, low-volume residential roads may be depicted with thin, blue lines. Maps rendered graphically on computer displays using geographic data have generally followed these conventions. However, rendering maps graphically on a computer display with lines of different colors, shapes and widths to represent different kinds of geographic features can use a relatively significant amount of computing resources. Some computing devices used for displaying maps are portable systems (such as in-vehicle or hand-held systems) that have limited memory or processing resources. Thus, some computing systems that render maps graphically may limit the different kinds of lines, shapes and colors used to depict different geographic features.

Accordingly, it would be beneficial to provide an improvement for rendering maps on a display of a computing platform. Further, it would be beneficial to provide a computationally efficient means for rendering graphically on a computer display a map that includes a relatively wide palette of colors, widths and types of lines to represent different types of geographic features.

SUMMARY

According to an exemplary embodiment, a computer-readable medium that has computer readable data stored thereon for representing geographic features in a geographic region is provided. The computer readable data includes data entities that represent linearly extending geographic features located in the geographic region, and a plurality of drawcodes. Each drawcode represents a unique combination of attributes associated with the linearly extending geographic features that are represented by the data entities, and each of the data entities that represent the linearly extending geographic features is associated with one of the drawcodes.

In another respect, the exemplary embodiment may take the form of a method of producing a geographic database. The method includes identifying combinations of attributes associated with linearly extending geographic features located in a geographic region that are in common among the linearly extending geographic features. The method also includes associating drawcodes with the combinations of attributes, where each drawcode is associated with a distinct combination of attributes. The method further includes storing data entities in the geographic database to represent the linearly extending geographic features, where data entities having the same drawcode are stored together in groups.

In still another respect, the exemplary embodiment may take the form of a method for storing computer readable data for representing geographic features in a geographic region. The computer readable data includes a plurality of data entities that each represent a linearly extending geographic feature located in the geographic region. The method includes associating each data entity with a drawcode, where each drawcode defines a distinct set of attributes associated with the geographic features. The method also includes sorting the plurality of data entities into groups by drawcode. The method further includes storing in a computer-readable database, the sorted plurality of data entities.

In yet another respect, the exemplary embodiment may take the form of a method for displaying images of portions of a geographic region on a computer display. The images portray linearly extending geographic features located in the geographic region. The method includes reading from a computer readable database stored on a computer readable medium a group of data entities. The data entities represent the linearly extending geographic features, and each data entity in the group has an associated drawcode which defines a combination of attributes associated with the represented linearly extending geographic feature. The method further includes rendering on the computer display images of the linearly extending geographic features that correspond to the data entities in the group.

Any of the methods of the exemplary embodiment may be stored in the form of computer-readable data on a computer readable medium. A processing unit may then access the computer readable medium, execute the computer-readable data, and perform the methods.

These as well as other features, advantages and alternatives will become apparent to those of ordinary skill in the art by reading the following detailed description, with appropriate reference to the accompanying drawings.

DETAILED DESCRIPTION OF EXEMPLARY EMBODIMENTS

Figure 1:
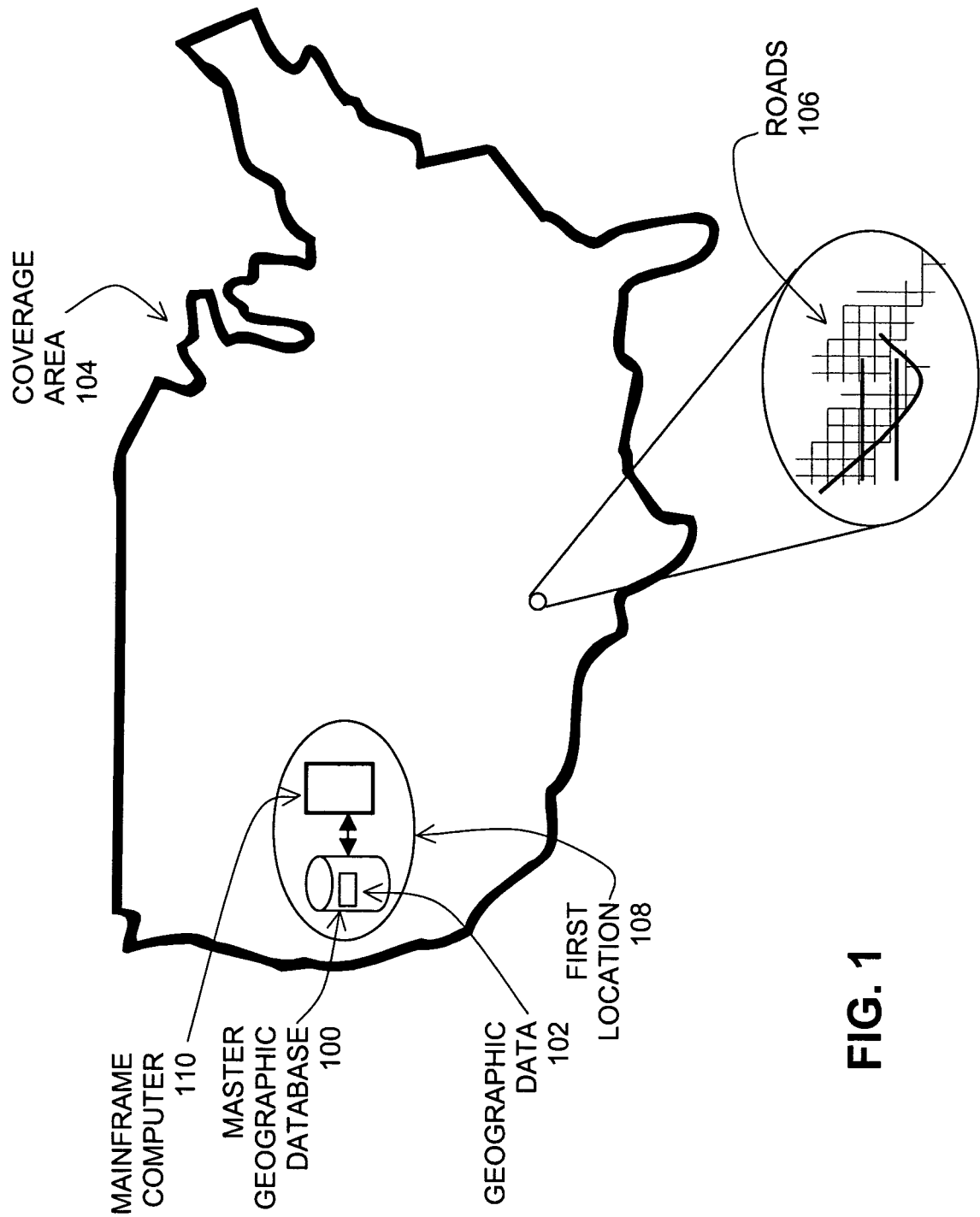
FIG. 1 is a diagram that illustrates a relationship between a master version of a geographic database and a coverage area.

In an exemplary embodiment, a mechanism for efficiently rendering a richly attributed representation of geographic features in a geographic region is provided. Within a database containing geographic data, polyline data entities represent linearly extending geographic features, which can include roads, railroads, ferry routes, bridges, tunnels, or rivers, for example. According to the exemplary embodiment, each polyline data entity is associated with a drawcode. A drawcode is a number, code, or alphanumeric string defined by a geographic database developer. Each drawcode is used to represent a distinct set of attributes associated with the linearly extending geographic features. The particular attributes of the linearly extending geographic features used for determining drawcodes are selected by the geographic database developer. Each drawcode is also associated with a set of drawing characteristics. Thus, the drawing characteristics to be used for each type of geographic feature being rendered may be obtained by reference to the drawcode associated with the polyline data entity that represents the corresponding geographic feature. In this manner, geographic features can be rendered efficiently.

I. Formation of Compiled Geographic Databases from a Master Geographic Database

Referring now to the figures, FIG. 1 shows a master version of a geographic database 100. The master version of the geographic database 100 contains geographic data 102 that represent geographic features in a coverage area 104. The coverage area 104 may correspond to an entire country, such as the United States as shown. Alternatively, the coverage area 104 may correspond to several countries, such as the United States, Canada, and Mexico, or France, Germany, and Italy, and so on. According to another alternative, the coverage area 104 of the master version of the geographic database 100 may represent only a single region within a country, such as the West Coast or the Midwest of the United States. Although the master version of the geographic database 100 includes data that represent geographic features in the entire coverage area 104, there may be parts of the coverage area 104 that contain geographic features that are not represented by data in the geographic database, or for which the representation of geographic features is sparse.

The master version of the geographic database 100 includes data about a road network 106 located in the coverage area 104. The data about the road network 106 include various kinds of information, such as the geographic coordinates of positions of the roads, street names of the roads, address ranges along the roads, turn restrictions at intersections of roads, and so on. The master version of the geographic database 100 also includes data about points of interest in the covered area 104. Points of interest may include hotels, restaurants, museums, stadiums, offices, automobile dealerships, auto repair shops, etc. The master version of the geographic database 100 may include data about the locations of these points of interests. The master version of the geographic database 100 may also include data about places, such as cities, towns, or other communities. The master version of the geographic database 100 may include other kinds of information as well.

The data about the geographic features in the coverage area 104 are collected by a geographic database developer, such as Navigation Technologies Corporation of Chicago, Ill. However, it is understood that the inventive concepts disclosed herein are not restricted to any particular source of data.

A geographic database developer may collect data in many different ways. These ways include obtaining data from other sources, such as municipalities. In addition, the geographic database developer may employ field personnel to travel by vehicle along roads throughout the geographic region to observe features and record information about them. The data collected by the geographic database developer are stored in the master version of the geographic database 100.

The geographic database developer continues to collect data that represent the features in the geographic coverage area 104 on an ongoing basis due to changes that occur over time. Accordingly, the geographic database developer collects data about the same features to update or confirm previously collected data about the features. In addition, the geographic database developer continues to collect data to expand the coverage of the master version of the geographic database 100. For example, at one point in time the master version of the geographic database 100 may include data that represents only a portion of the entire coverage area 104. After that point in time, the geographic database developer collects data about features in areas that were not previously represented to expand the coverage of the master version of the geographic database 100.

The master version of the geographic database 100 is maintained as the copy that has the most up-to-date data relating to the coverage area 104. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. For example, the data in the master version 100 may be uncompressed. Examples of suitable formats include the Virtual Storage Access Method (VSAM) format and the Geographic Data Files (GDF) format, although other kinds of formats, both proprietary and non-proprietary, may be suitable. In general, the format of the master database 100 is not suitable for use in navigation systems.

A copy of the master version of the geographic database 100 is physically located at a first location 108. In one embodiment, the master version of the geographic database 100 is stored on one or more hard drives, tapes or other media, and accessed with an appropriate mainframe computer 110. Any suitable computer may be used, such as a mainframe computer, a plurality of networked microcomputers, etc.

Figure 2:
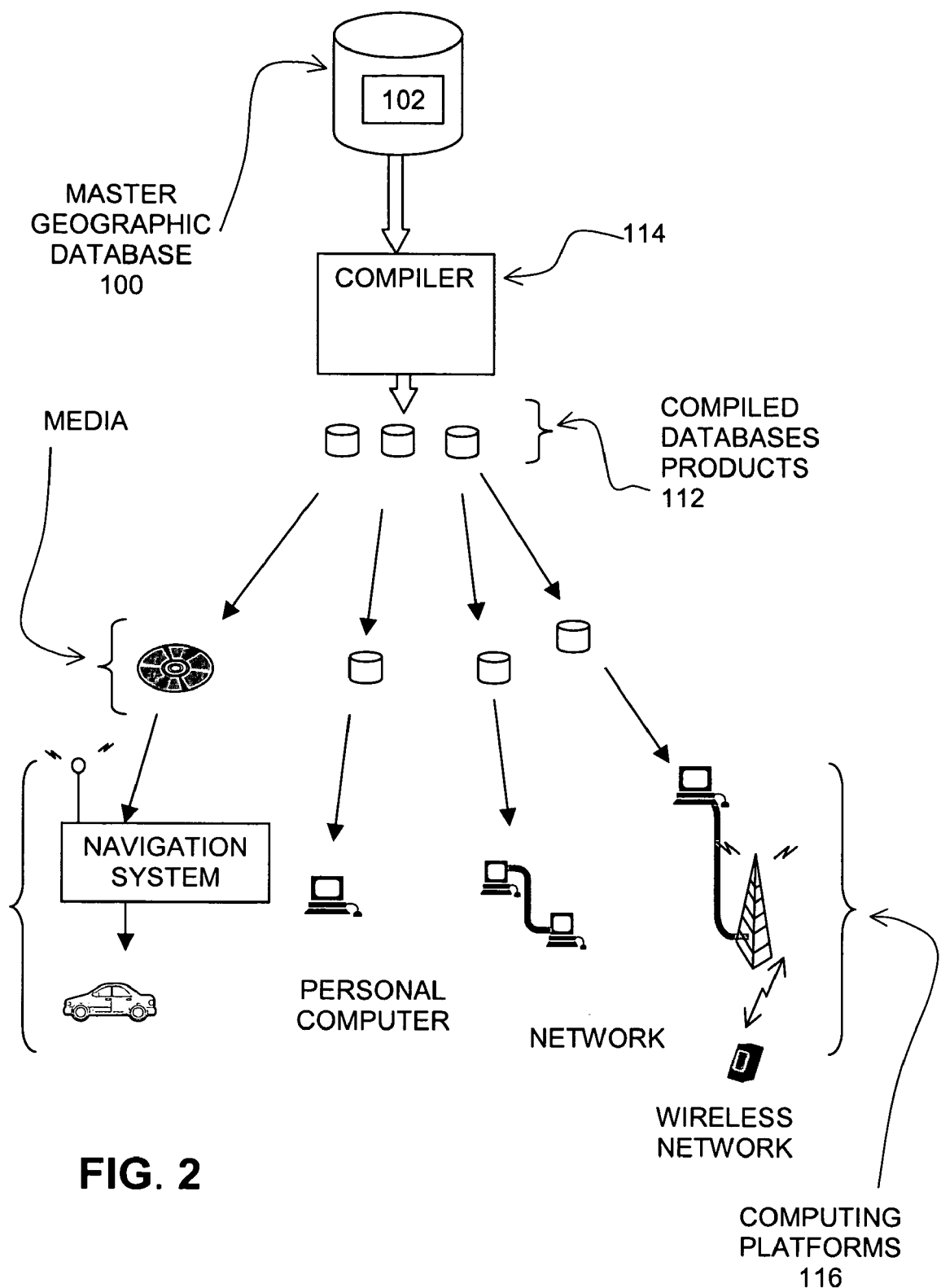
FIG. 2 is a diagram that illustrates formation of geographic database products from the master version of the geographic database shown in FIG. 1.

Referring to FIG. 2, an overview process for providing navigational features to a user is illustrated. As shown, the master version of the geographic database 100 is used to make compiled database products 112. The compiled database products 112 are made using a compiler 114. The compiler 114 is a software program run on an appropriate computer platform and is described in more detail below.

The compiled database products 112 may include only portions of all the data in the master version of the geographic database 100. For example, the compiled database products 112 may include data that relate to only one or more specific sub-areas within the coverage area 104 of the master version of the geographic database 100. Further, the compiled database products 112 may include fewer than all the data attributes that describe geographic features represented in the master version of the geographic database 100.

The compiled database products 112 are used on various kinds of computing platforms 116. For example, the compiled database products 112 are used in navigation systems (such as in-vehicle navigation systems and hand-held portable navigation systems), personal computers (including desktop and notebook computers), and other kinds of devices, such as pagers, telephones, personal digital assistants, etc. The compiled database products 112 are also used on networked computing platforms and environments, including systems connected to the Internet or wireless networks.

The compiled database products 112 are stored on media that are suitable for the hardware platforms on which they are used. For example, the compiled database products 112 may be stored on CD-ROM disks, hard drives, DVDs (Digital Versatile Disks), flash memory, or other types of media that are available now or that become available in the future.

On the computing platforms 116, the compiled database products 112 are used by various software applications. For example, the compiled database products 112 may be used by software applications that provide navigation-related functions, such as route calculation, route guidance, vehicle positioning, map display, and electronic yellow pages, as well as other kinds of functions. Thus, each compiled database product 112 may have data arranged in a format specifically suited for a particular navigation application.

II. Example Computing Platform

Figure 3:
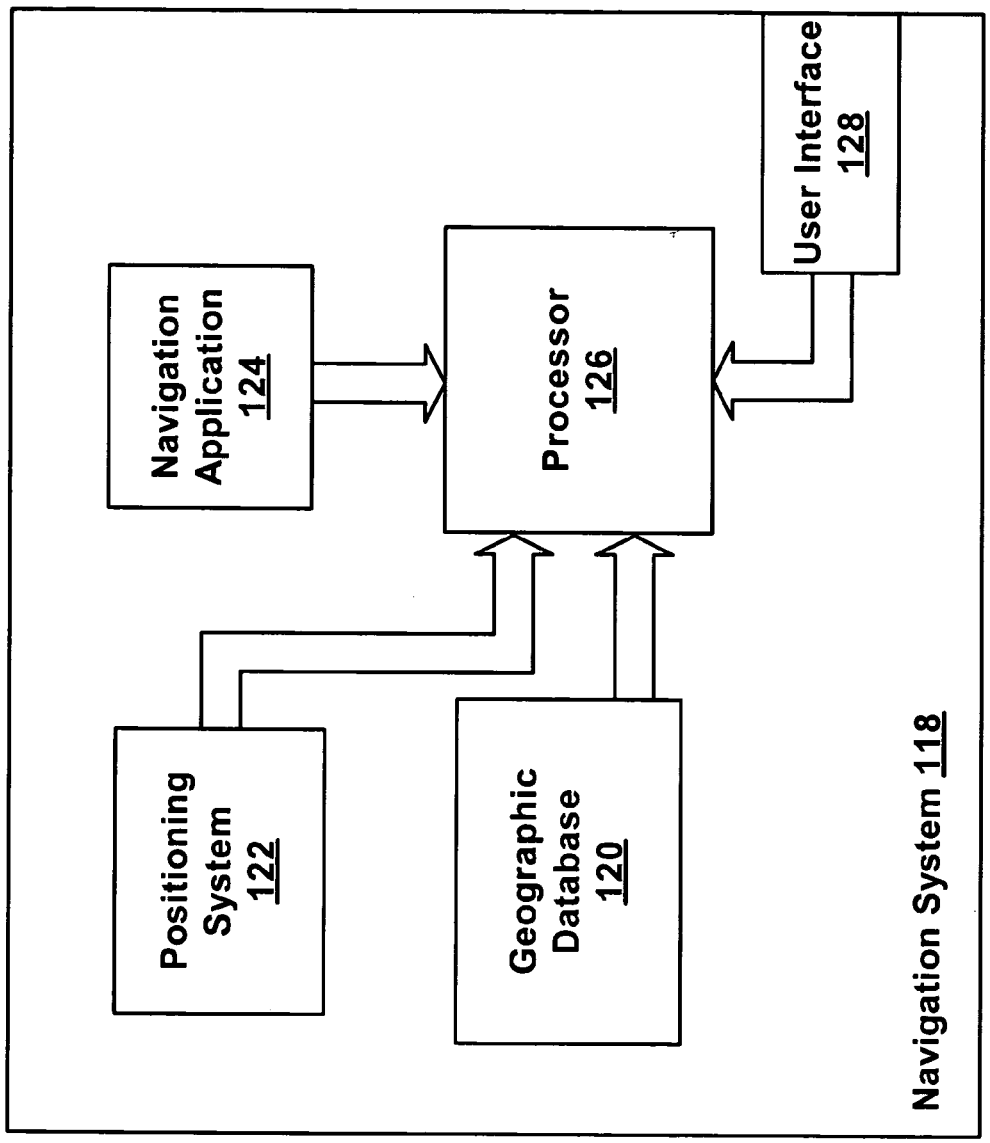
FIG. 3 is a block diagram illustrating one embodiment of a computing platform shown in FIG. 2 that may perform functions in accordance with the exemplary embodiment.

FIG. 3 is a block diagram illustrating one embodiment of a computing platform in the form of a navigation system 118 that may perform functions in accordance with an exemplary embodiment. It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location. Still further, any of these or other entities that are described herein as carrying out a particular function could include a processor and data storage holding an appropriate set of program instructions (e.g., machine language instructions) executable by the processor to carry out that function.

The navigation system 118 is a combination of hardware and software components which can be implemented in various different kinds of environments or on different platforms. For example, the navigation system 118 may be located in an automobile to enable route calculation. The navigation system 118 may also be implemented as a hand-held portable system, or may be implemented on a personal computer (such as a desktop or portable notebook) or a personal digital assistant, for example.

To provide navigating functions, the navigation system 118 includes a compiled geographic database 120, which may be stored on any type of computer readable medium. The compiled geographic database 120 may be one of the compiled database products 112.

The navigation system 118 further includes a positioning system 122, which may employ any of several well-known technologies to determine or approximate a user's physical location in a geographic region. For example, the positioning system 122 may employ a GPS-type system (global positioning system), or other systems, all of which are well-known in the art. To this end, the positioning system 122 may comprise a GPS system, an antenna, sensors coupled to sense a vehicle speed and distance traveled, and a compass to sense a vehicle direction, for example.

The navigation system 118 also includes appropriate software programming, such as one or more a navigation applications 124, which use the compiled geographic database 120 and the positioning system 122 to provide various navigation features to a user of the navigation system 118. The navigation application 124 may be stored on a data storage device. The navigation applications 124 may be written in a suitable computer programming language such as C, although other programming languages or machine language instructions are also suitable. The navigation system may also include suitable operating system software.

The navigation system 118 includes appropriate hardware, such as memory, and one or more processors. The memory may include random access memory (RAM), or any additional or alternative memory device or memory circuitry. Secondary storage can be provided as well and may be persistent long term storage, such as read only memory (ROM), optical or magnetic disks, compact-disc read only memory (CD-ROM), or any other volatile or non-volatile storage systems.

The navigation system 118 includes a user interface 128 operatively coupled to the hardware and software. The user interface 128 includes appropriate means for receiving instructions and input from a user as well as means for providing information back to the user. For example, the user interface 128 may include a microphone, input panel or keyboard into which a user may indicate a selection of a destination. The user interface 128 may also include a display or speakers by which the user can be informed of navigation information.

The navigation system 118 may also include other elements as well. For example, the system 118 may include a drive (not shown) or other suitable peripheral device into which a data storage medium can be installed that includes one or more geographic data sets stored thereon. The storage medium may be a CD-ROM disc, a PCMCIA card in which case the drive would be substituted with a PCMCIA slot, or various other storage media such as fixed or hard disks, DVD, flash cards, memory cards, or other available storage media.

All of the components described above within the navigation system 118 may be conventional (or other than conventional) and the manufacture and use of these components are known to those of skill in the art.

During a usage of the navigation system 118 illustrated in FIG. 3, a user may provide input into the user interface 128, such as a request for navigation information. The hardware and software process the input and may obtain information from the positioning system 122, such as the location, direction, speed, etc., of the user's vehicle. The hardware and software may access the compiled geographic database 120 and execute the navigation application 124 to provide the user with a graphical display (e.g., a map) of the user's specific location in the geographic region, or with directions to a specific location, for example.

III. Organization of the Compiled Geographic Databases

A. Overview

In the compiled database products 112, the geographic data are organized differently than in the master version of the geographic database 100. A compiled database is organized, arranged, structured and stored in a form that facilitates the use of the data in the computing platform in which it is installed. A compiled database may also be stored in a compressed format on the media on which it is located. Some of the ways in which geographic data can be organized for use in computing platforms are described in U.S. patent application Ser. Nos. 10/201,098, 10/244,269, 10/304,229, and 10/426,001 and U.S. Pat. Nos. 5,951,620, 5,953,722, 5,968,109, 5,974,419, 6,038,559, 6,081,803, 6,038,559, 6,112,200, 6,118,404, 6,122,593, 6,184,823, 6,249,742, 6,308,177, 6,324,470, 6,336,111, and 6,393,149, the entire disclosures of which are incorporated by reference herein.

B. Representation of Roads

Figure 4:
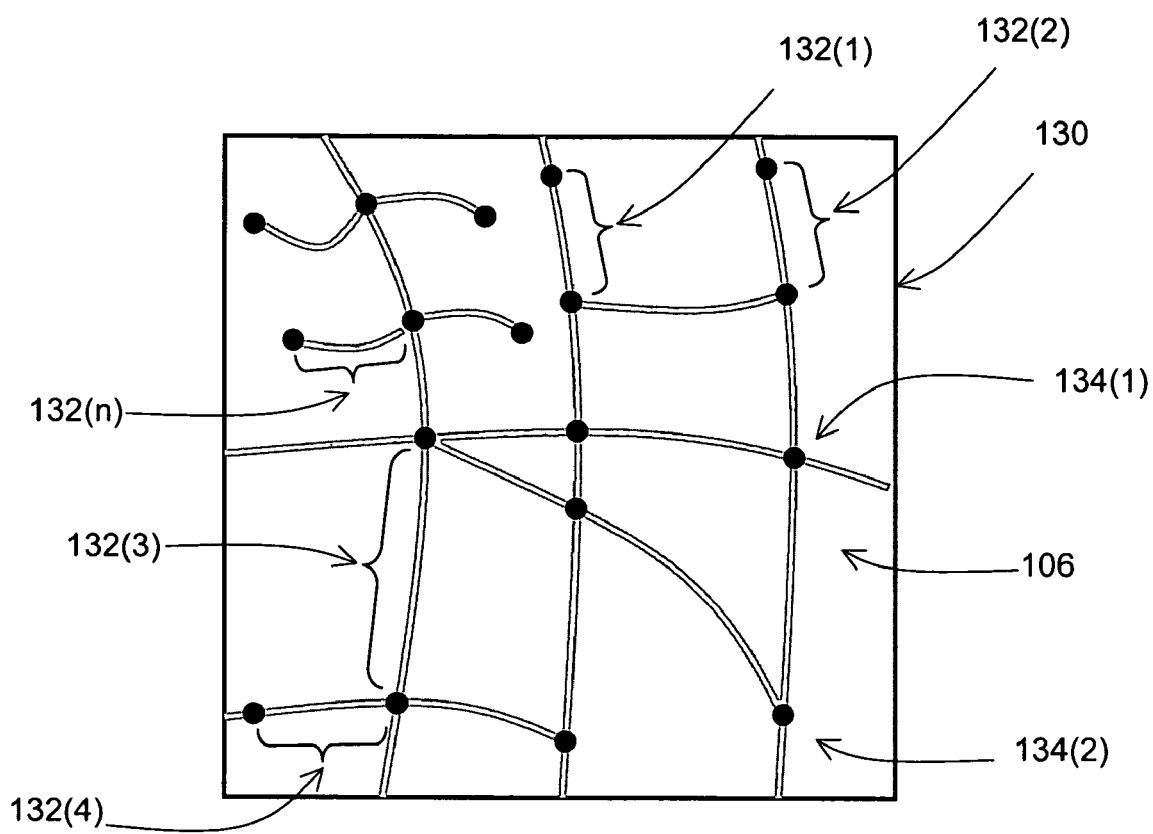
FIG. 4 is a map showing a portion of the coverage area of FIG. 1.

FIG. 4 shows one way in which roads are represented in geographic databases, such as the compiled database products 112 in FIG. 2. FIG. 4 shows an expanded view of a portion 130 of the coverage area 104 shown in FIG. 1. The portion 130 in FIG. 4 illustrates part of the road network 106 in the coverage area 104. The road network 106 includes, among other things, roads and intersections located in the coverage area 104. As illustrated in FIG. 4, each road in the coverage area 104 is composed of one or more links or segments, 132(1), 132(2) . . . 132(n). In one embodiment, a link is a portion of a road represented as data in the geographic database. In FIG. 4, each link 132 is shown to have associated with it two nodes, also referred to as "endpoints." One node 134(1) represents the point at one end of the link and the other node represents the point at the other end of the link 134(2). The node at either end of a link corresponds to a location at which the road meets another road, e.g., an intersection, or where the road dead ends. An intersection may not necessarily be a place at which a turn from one road to another is permitted, but represents a location at which one road and another road have the same latitude, longitude and elevation coordinates. In some cases, a node may be located along a portion of a road between adjacent intersections, e.g., to indicate a change in road attributes, a railroad crossing, or for some other reason. (The terms "node" and "link" represent only one terminology for describing these physical geographic features and other terminology for these features is intended to be encompassed within the scope of these concepts.)

In one type of geographic database, there is at least one database entry (also referred to as "entity" or "record") for each represented link in the coverage area 104.

C. Separate Functional Types of Geographic Data

Figure 5:
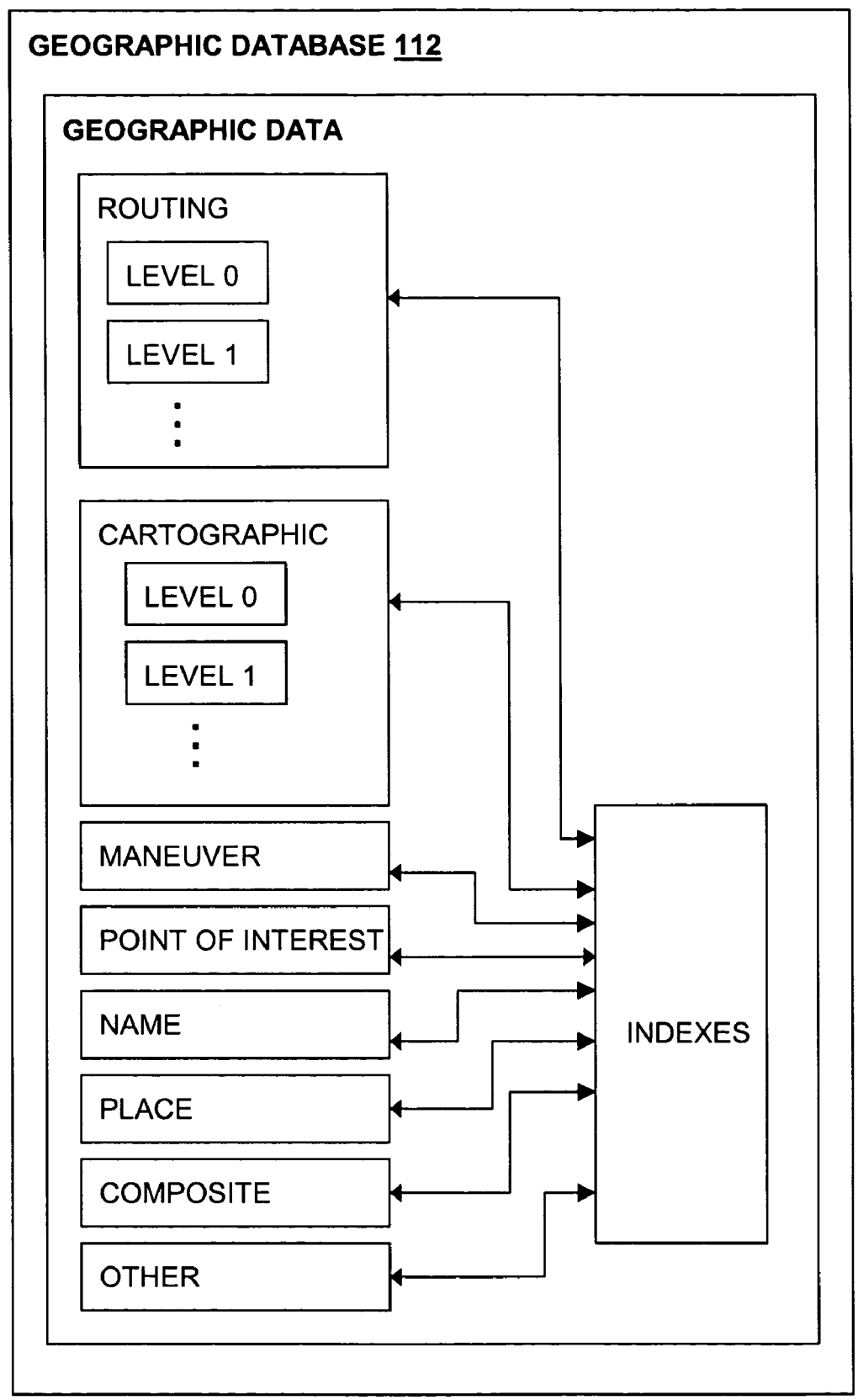
FIG. 5 is a block diagram that shows an embodiment for organizing the geographic database products of FIG. 2.

As mentioned above, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function, but excludes data and attributes that are not needed for performing the function. FIG. 5 illustrates one way of providing separate subsets of geographic data based on function. In FIG. 5, the compiled database product 112 (e.g., geographic database) comprises separate collections of routing data, cartographic data (for map display), maneuver data (for route guidance), point-of-interest data, and so on. The compiled geographic database 112 may be defined with fewer or more of these different types of data, and other types of data may be defined and included. In addition, one or more of these different types of data (or levels thereof, as explained below) may be combined into a composite type. To permit these subsets of data types to work together, one or more indexes are included that provide cross references, search trees, or other data finding techniques.

The routing data contains information that is used by a navigation application program to calculate routes between two locations within a geographic region represented by the geographic database 112. The cartographic data contains geographic feature information that is used by a navigation application program to display image representations (e.g., maps) of various portions of the geographic region represented by the database product 112 on a graphical display device associated with a navigation system. The maneuver data contains information used by a navigation application program to generate navigation instructions for a given route between two locations within the geographic region represented by the database product 112. The POI data contains information associated with various points of interest located in the geographic region represented by the database product 112, such as museums, restaurants, hotels, airports, stadiums, and so on. Alternatively, the database product 112 may contain additional information to support other features of the navigation system.

D. Levels of Geographic Data

Another way that the geographic data can be organized to enhance the use thereof is to provide the data in levels. Some of the navigation-related functions, such as the map display function and the route calculation function, may use data at different levels of detail. To implement different levels of data, each represented road segment is associated with a rank that corresponds to a functional class of road. Road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.

The rank of a represented road is used to specify the highest data level in which a data entity that represents the road is included. For example, referring to FIG. 5, the routing type data may include separate levels of the data, "level 0", "level 1", etc., each comprising a separate collection of the routing data with a different level of detail, and each of which can be used by the route calculation function. In the routing type of data, level 0 includes the link data records having a rank of "0" or higher, thus, level 0 includes link data entities corresponding to all the represented portions of all the roads in the geographic region. Level 1 of the routing data comprises a separate subset (or collection) of the routing data and includes only the link data entities having a rank of "1" or higher. Level 2 of the routing data comprises a separate subset of the routing data and includes only the link data entities having a rank of level 2 or higher, and so on. A highest level includes only records having a rank of n. Each higher level includes fewer records, however these records represent roads upon which travel is generally faster. Route calculation may be facilitated by using the higher levels of routing data, whenever possible, e.g., for portions of a route away from the origin or destination. Other road attributes, in addition to rank, may also be used to help determine the routing data level.

Similarly, the other types of data, such as the cartographic data type, may include separate collections of the data, each with a different level of detail, which can be used by the map display function. Using these different levels of cartographic data, the map display function can provide rapid panning and zooming.

Although the organization of some of the data into levels results in some duplication of the data, the increased efficiency generally offsets any disadvantages. As with the use of separate functional types of data mentioned above, the need arises to allow these different levels to work together. The indexes, which include cross references, search trees, or other finding techniques, may be provided for this purpose.

E. Parcelization

Another way to facilitate use of the data in a compiled geographic database is to organize some or all of the data into parcels. Parcelization refers to organizing data in the geographic database into groupings such that the data in each grouping is located together physically and/or logically in the database, thereby facilitating access of the data together at the same time as a group. In one embodiment, a parcel contains data that are always accessed together. A parcel may be related to the quantity of data that can be accessed in a single disk access, although a parcel may be related to some other factor. The size of a parcel may be related to the type of media upon which the geographic database is stored. In one embodiment, a parcel may be established to be approximately 100 Kilobytes (K) of data. Other sizes of data may be used including 1 K, 2 K, 4 K, 8 K, 16 K, 32 K, 100 K, 256 K, and so on. Within a geographic database, all the parcels may conform to a uniform parcel size, or alternatively, there may be more than one uniform parcel size.

F. Spatial Organization

Another way to facilitate use of the data in the compiled geographic database is to organize some of the data spatially. Spatially-organized data are arranged so that the data that represent geographically proximate features are located logically and/or physically proximate in the compiled database product 112 and/or on the medium containing the database. One way to organize the data spatially is to parcelize the data spatially. When geographic data are parcelized spatially, features that are close together physically in the coverage area are represented by data in the same parcel.

Before forming spatial parcels, the data are first separated into the different functional types, such as routing, cartographic, composite, points of interest, and so on. Some of these kinds of data may be parcelized spatially in order to facilitate use of the data by the navigation functions and others of these kinds of data may not be parcelized spatially. In addition, if a type includes separate levels, the data in each level are separately parcelized.

There are a number of different procedures that can be used for spatially parcelizing geographic data. For example, a simple spatial parcelization method may provide for separating the geographic data into a plurality of parcels or groupings where the data in each parcel represent features encompassed within a separate one of a plurality of regular-sized rectangles which together form a regular, rectangular grid over the entire geographic region. Another method for spatial parcelization is to separate the data into parcels wherein the data in each parcel represent features encompassed within rectangular areas where each of the rectangles is formed by a bisection of rectangles encompassing parts of the region until a parcel size below a maximum threshold is obtained. In addition, spatial parcelization procedures are disclosed in U.S. Pat. Nos. 5,974,419 and 5,968,109 and U.S. patent application Ser. No. 10/304,229, the entire disclosures of which are incorporated by reference herein.

Figure 6:
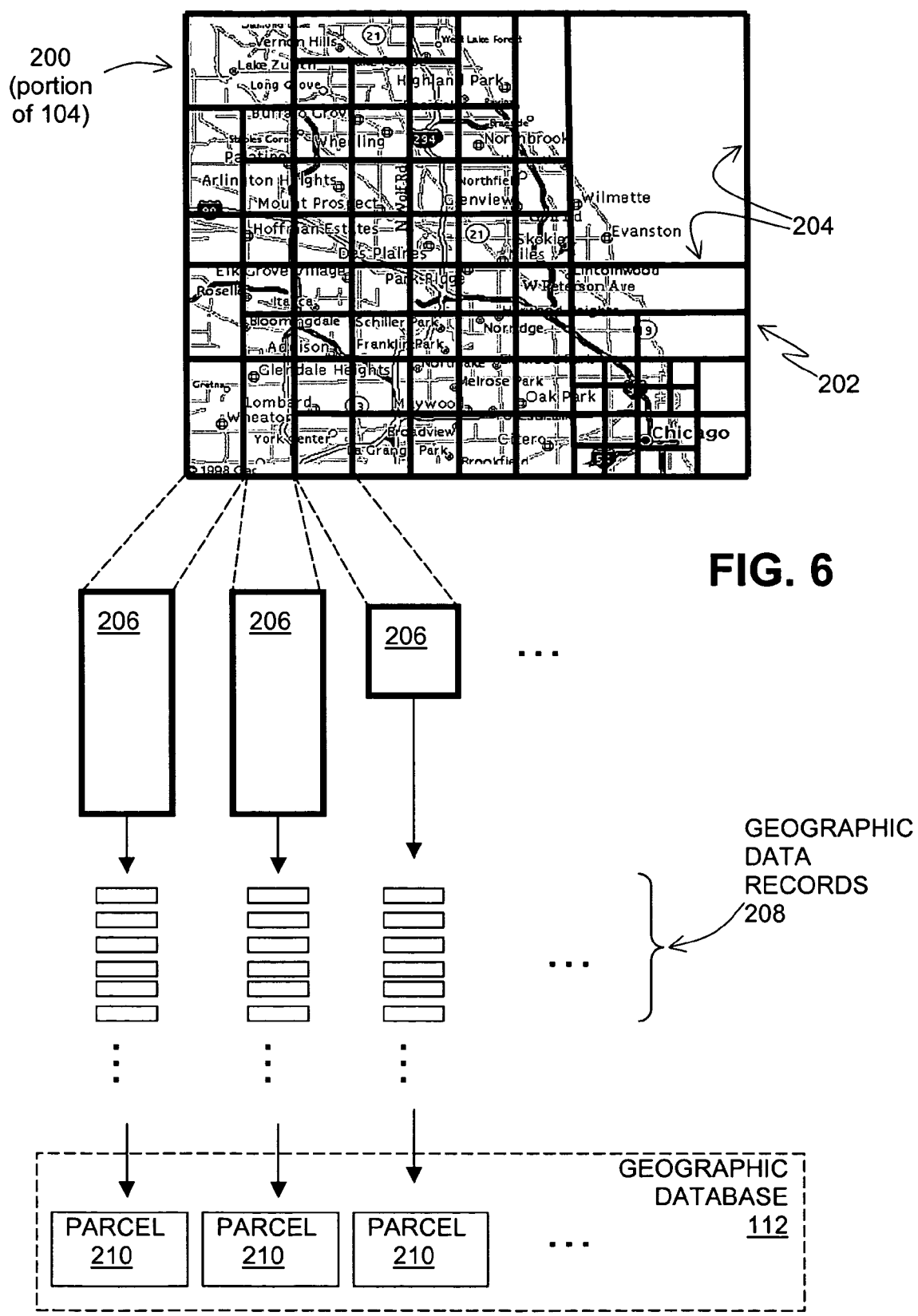
FIG. 6 is a diagram that illustrates spatial parcelization of one of the data products of FIG. 2.

FIG. 6 illustrates spatial parcelization of data contained in the compiled geographic database product 112. FIG. 6 shows a map of an area 200. The area 200 is a portion of the coverage area 104 in FIG. 1. In FIG. 6, a grid 202 overlays the map. The grid 202 is formed of grid lines 204 that divide the portion 200 of the represented coverage area 104 into a plurality of sub-areas 206. (Thus, the geographic sub-areas 206 make up the entire coverage area 104.) In this embodiment, the sub-areas 206 are rectangular; however, in alternative embodiments the sub-areas 206 may have other shapes. The grid lines 204 of the grid 202 represent the boundaries of the sub-areas 206. These sub-areas 206 may have different dimensions, as shown in FIG. 6. Alternatively, the sub-areas 206 may all have the same dimensions. The dimensions of the sub-areas 206, as well as whether all the sub-areas 206 have the same dimensions, depend upon the procedure used for spatially parcelizing the data. Likewise, the locations of the boundaries of the sub-areas 206 depend upon the procedure used for spatially parcelizing the data.

In this embodiment, each functional type of data and each level of a leveled functional type is separately spatially parcelized. When a type or layer is spatially parcelized, individual data records 208 (of that type or layer) that represent the geographic features that are encompassed within each separate sub-area 206 are gathered together in a separate parcel 210 (or grouping) of data. Thus, each parcel 210 of data contains all the geographic data records 208 (of that type or level) that represent the geographic features encompassed within a corresponding geographic sub-area 206. In other words, the physical features represented by the geographic data in any one parcel are all next to each other and encompassed by a geometric boundary that excludes the physical features represented by data included in all of the other parcels. In a present embodiment, the geometric boundary is rectangular.

As stated above, all the parcels 210 of a level or type may have a uniform parcel size, such as 1K, 2K, 4K, 8K, 16K, 32K, 100K, 256K, and so on. The parcel size is determined based upon several factors, such as the media upon which the data are to be stored and/or the memory resources of the end users' computing platforms. In order to make each parcel conform to a uniform parcel size, the boundaries of the rectangular areas are selected so that the amount of data representing the features in a bounded area is less than the desired parcel size and then an amount of data padding ("0's") is added to the data so that the parcel conforms to the desired uniform parcel size. A geographic database may include parcels of more than one uniform parcel size.

As shown in FIG. 6, the parcels 210 are stored to form the database 112 so that the data in each parcel 210 are logically and/or physically grouped together. A parcel 210 may represent the physical quantity of data that can be accessed at a time by the end user's system. When a parcel of data is accessed, all of its data records 208 are read from the medium on which they are stored into the memory of the system at the same time. With reference to the map of FIG. 6, this means that all the data records, such as the link records of a spatially organized type of data encompassed within each rectangular sub-area 206, are accessed together as a group. It can be appreciated that for certain kinds of navigation functions, it is desirable to have in memory at the same time all the data records that represent features that are physically close together in the geographic region.

Figure 7:
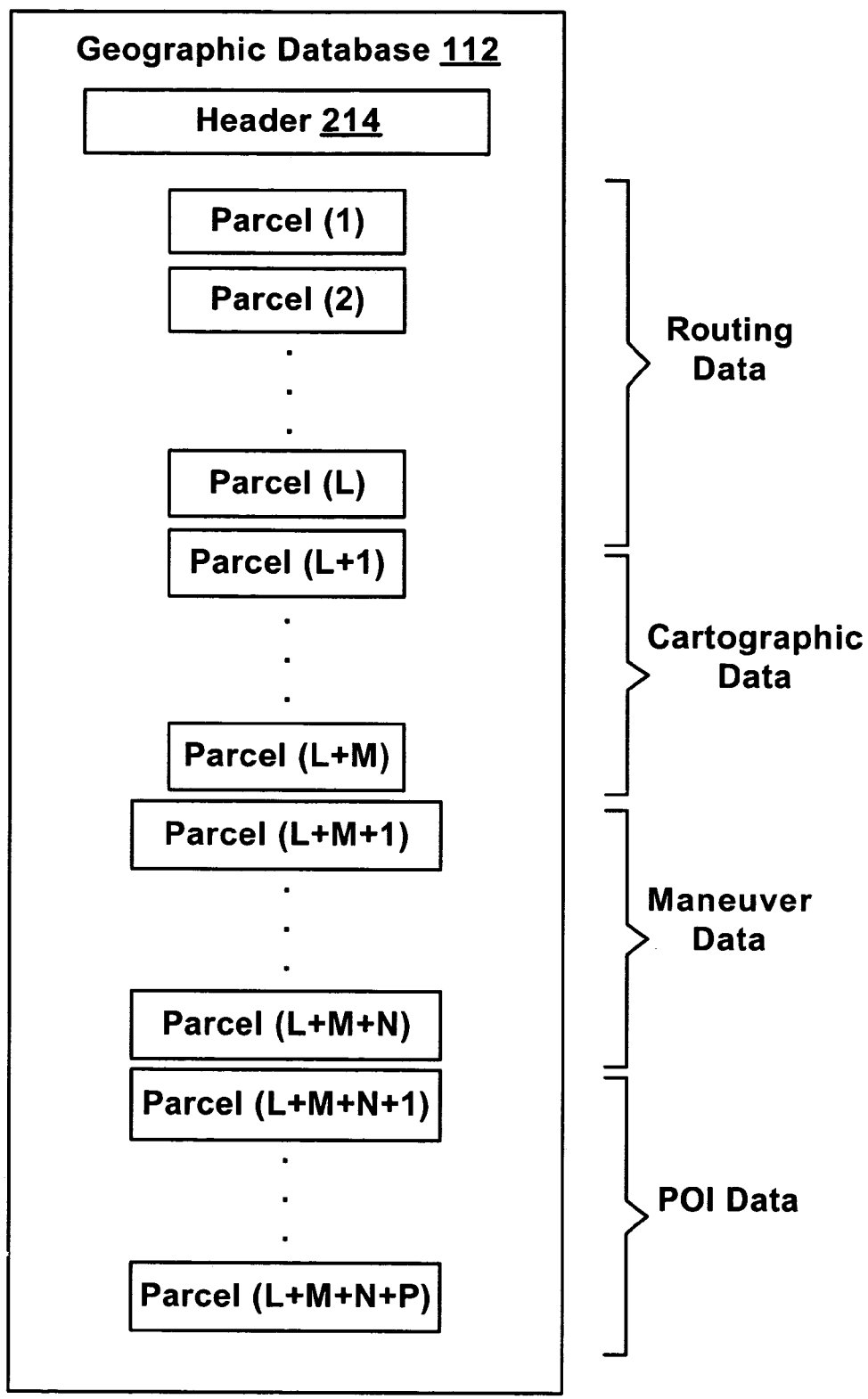
FIG. 7 is a diagram illustrating an organization of the geographic database of FIG. 6 embodied on a data storage medium.

FIG. 7 is a diagram further illustrating one embodiment of an organization of the geographic database 112. The geographic database 112 includes header data 214 and geographic data. The header data 214 includes information pertaining to the entire geographic database 112, such as an identification of the region represented by the database 112, the release date of the database 112, and so on. The geographic data includes the data relating to the geographic features, and organized into parcels as shown in FIG. 6. Specifically, the geographic data includes all the data which correspond to the different types of geographic data represented in FIG. 5, such as the routing data, the cartographic data, the maneuver data and the POI data, for example. As shown in FIG. 7, parcels (1) through (L) contain routing data, parcels (L+1) through (L+M) contain cartographic data, parcels (L+M+1) through (L+M+N) contain maneuver data, and parcels (L+M+N+1) through (L+M+N+P) contain POI data. As stated above, the cartographic data, included in the parcels (L+1) through (L+M), contain the information that is used for rendering portions of the geographic region represented by data in the geographic database 120 on a display, for example. In this embodiment, the parcels are also organized by levels as described herein.

G. Formation of New Types of Data Entities

Another way to facilitate use of the data in a compiled geographic database is to form new types of data entities. These new types of data entities do not exist in the master version of the geographic database. These new types of data entities are formed by the compiler (114 in FIG. 2), using the data from the master version of the geographic database. As an example, the performance of some navigation functions can be improved by representing several separate connected links with a single data entity. For example, in the cartographic data type (in FIGS. 5 and 7), a continuous linear feature, such as a road, located in the geographic sub-area corresponding to a parcel of cartographic data, can be represented with a single data entity instead of a plurality of separate links represented by separate link data entities. Representing several connected links in this way may facilitate the map display process. Accordingly, during the compilation process, the compiler identifies connected links that can be represented in this manner (referred to as a "polyline") and forms a new type of data entity (i.e., a polyline data entity) to represent them. The polyline data entity is used by a map display application to render a representation of road, river, etc. These polyline data entities are stored in the cartographic parcels. Further description of polylines can be found in U.S. Pat. Nos. 5,968,109 and 6,118,404, the entire disclosures of which are incorporated by reference herein.

Each of the polyline data entities contains data useful for rendering the represented linearly extending feature on a display. Each polyline data entity includes end point data which identify the two end points of the continuous linear geographic feature. The end point data may identify the location (e.g., geographic coordinates, such as latitude and longitude) of the right end point and the location (e.g., geographic coordinates, such as latitude and longitude) of the left end point of the geographic feature represented by the polyline data entity.

Each polyline data entity may include shape point data. If the continuous geographic feature represented by the polyline data entity is other-than-straight (e.g., a curved road), the polyline line data entity may include shape point data that define the shape of the continuous linear feature by identifying the geographic coordinates (e.g., latitude and longitude) of one or more physical locations through which the continuous linear geographic feature passes. (Although the term "shape point" is used, other terminology may be used to indicate the same or similar concepts, such a "locus" or "position", to identify these features.)

The polyline data entity also includes attribute data indicating the kind of geographic feature the polyline data entity represents. For example, the type data may include data indicating that the polyline data entity represents a limited access expressway, a tollway, a bridge, a ferry, an alley, a side street, a railroad track, a river, and so on. The polyline data entity may include other attribute data as well.

IV. Method for Storing Data Representing Geographic Features

Figure 8:
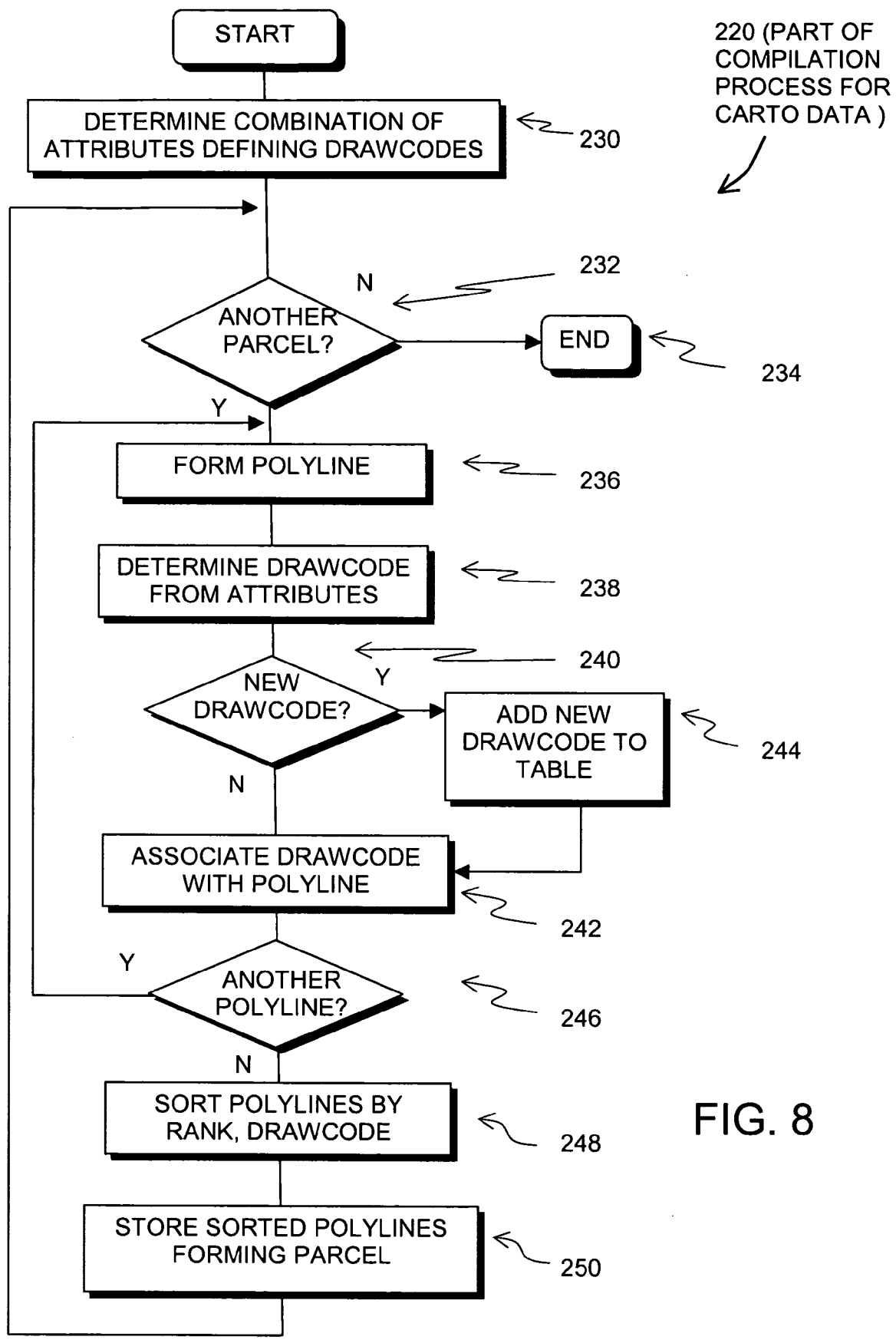
FIG. 8 is a flowchart depicting functional blocks of a method for storing computer readable data for representing geographic features in a geographic region according to an exemplary embodiment.

FIG. 8 is a flowchart depicting functional blocks of a method 220 for storing computer readable data for representing geographic features in a geographic region according to this embodiment. At block 230, prior to performing the compilation steps in FIG. 8, the set of attributes to be used for defining drawcodes is determined. Each drawcode represents a unique combination of selected attributes associated with a polyline. For example, a drawcode may represent a combination of rank (e.g., 1–5), a road type (e.g., highway, boat ferry, bicycle path), and other road attributes (e.g., bridge, toll, tunnel, scenic). Thus, as one example, a single drawcode could represent all roads that are rank 1 highways that are toll roads through a scenic area. A drawcode table may be used to store entries representing each different combination of selected attributes in a database, or portion thereof, such as in a parcel.

The attribute set used for a drawcode can be as complex or simple. In one embodiment, an attribute set is chosen that permits up to a maximum of up to 256 drawcodes for the database. This allows for eight bits (e.g., $2^8=256$) of additional storage used for determination of drawing attributes by a navigation system. Each different combination of these database attributes is represented by a corresponding drawcode. In alternative embodiments, more or fewer than 256 drawcodes may be permitted.

As stated above, in one embodiment of the compilation process, each functional type of data (e.g., routing, cartographic, POI, etc.) is formed in turn. Steps 232–250 of FIG. 8 are performed during formation of the cartographic data. For purposes of this embodiment, it is assumed that the parcel boundaries used for the cartographic data have already been determined. As mentioned above, the cartographic data includes data which are used to render an image of a portion of the geographic region on a display device. Part of the compilation process includes formation of polyline data entities which are included in the cartographic data. Polyline data entities may be included in each of the parcels (L+1) through (L+M) of the cartographic data (as illustrated in FIG. 7).

At block 232, the compiler continues to form cartographic parcels until all cartographic data needed to represent the region is completed at block 234. Part of the process of forming parcels of cartographic data includes formation of polyline data entities representing linearly extending geographic features, as indicated at block 236. The formation of these data entities is described above and in U.S. Pat. Nos. 5,968,109 and 6,118,404, the entire disclosures of which are incorporated by reference herein. In forming polyline data entities, connected road segments (i.e., links) that have the same combination of selected attributes are identified. Then, a polyline data entity is formed to represent these connected road segments. In a present embodiment, the combination of selected attributes used to determine whether connected road segments should be represented by a single polyline data entity is the same combination of attributes used for determining drawcodes.

At blocks 238 and 240, it is determined whether the attributes of the polyline data entity correspond to a drawcode already defined in the drawcode table (i.e., which would have resulted from a previous polyline data entity). If the polyline data entity attributes correspond to an existing drawcode, then the polyline data entity will be assigned that same drawcode at block 242.

At step 244, if the polyline data entity's particular combination of attributes does not correspond to an existing drawcode, a new drawcode is assigned to the data entity at block 242. The new drawcode represents the polyline data entity's particular combination of attributes and is added to a drawcode table. In this embodiment, the drawcode table includes entries that describe each particular combination of attributes represented by each drawcode. The drawcode table continues to be built during the compilation of the cartographic data. The drawcode table is generated as each new combination of drawcode attributes is identified among the polyline data entities. The drawcode table grows during the compilation of the cartographic data and is complete at the end of compilation of the formation of cartographic parcels. The completed drawcode table 245 is stored in a global section of the geographic database, such as in the header 214 (in FIG. 7).

In one embodiment, the drawcode table setting forth the combination of attributes defining drawcodes may contain a row for each unique combination of the attributes found in the database. Table 1A below is an exemplary drawcode table.

TABLE 1A

| Drawcode | Rank | Road Type | Road Attributes |
|----------|------|-----------|-----------------|
| 0 | 4 | Boat Ferry | Bridge |
| 1 | 3 | Rail Ferry | Tunnel |
| 2 | 1 | Highway | Tollway |
| 3 | 2 | Ramp | Paved |
| . | . | . | . |
| . | . | . | . |
| 100 | 0 | Bike Path | Scenic |
| . | . | . | . |
| . | . | . | . |

Table 1A shows the particular combinations of attributes including rank, road type, and road attributes corresponding to a specific drawcode. Each row of table thus represents a specific, unique combination of attributes that can be associated with a polyline data entity. Thus, associating a polyline data entity with a drawcode enables a system to efficiently determine the features of the polyline. The exemplary attributes are discussed below.

A rank of a polyline can be defined from 0–4. The rank of a polyline corresponds to the ranks of the road segments of which it is formed. The rank associated with a road corresponds to a functional classification of the road, with higher ranked roads generally having fewer stops or speed changes and able to handle higher volumes of traffic than lower ranked roads. The rank of a road is used for route calculation purposes.

A road type has a value from 0–n. (In a present embodiment, n=18). The road type indicates any of the following: a 'boat ferry', a 'rail ferry', an 'access', a 'high speed ramp', an 'interstate', a 'motorway', a 'highway', an 'arterial', a 'parking area', an 'undefined traffic area', a 'ramp', a 'maneuver', an 'internal', an 'indescribable', a 'road', a 'pedestrian ferry', a 'pedestrian and deliver', a 'bicycle path', or a 'pedestrian only', for example. Others are possible as well.

The road attribute refers to different definitions, such as 'roads in process', 'tolls', 'bridges', 'tunnels', 'paved roads', 'scenic roads', 'controlled roads', 'drivable roads', 'divided roads', and 'multi digitized roads'. Any road attribute may be related to any combination of a road type and rank. In addition, a road attribute may include a combination of more than one of the definitions mentioned, such as 'paved' and 'scenic' or "multi digitized' and 'controlled'.

The theoretically possible number of different combinations of these attributes is $5 \times 19 \times 2^{10}$, or 97,280. However, a majority of combinations are not seen in actual data that represent a geographic region. It has been observed that the number of drawcodes needed to represent the combinations of these attributes actually observed in a geographic database is approximately 100. In one embodiment, an 8-bit number (permitting 256 different combinations of attributes) is used for the drawcode.

In one present embodiment, the drawing characteristics to be associated with each drawcode are provided separately, e.g., by the map display software application. However, in an alternative embodiment, the drawing characteristics to be associated with each drawcode may be included in the geographic database. If the drawing characteristics to be associated with each drawcode are included in the geographic database, they may be included in the drawcode table, or alternatively may be included in a separate table that is referenced by the drawcodes. The drawing characteristics may include a corresponding color, width and style to define how the geographic feature associated with a particular drawcode should be visually represented or displayed. For example, the drawcodes can be correlated to visual representations as shown in the table below:

TABLE 1B

| Drawcode | Color | Width | Style |
|---|---|---|---|
| 0 | Blue | 4 | Dash |
| 1 | Green | 3 | Dotted |
| 2 | Orange | 2 | Solid |
| 3 | Red | 1 | Solid |
| . | . | . | . |
| . | . | . | . |
| . | . | . | . |
| 100 | Black | 0 | Solid |
| . | . | . | . |
| . | . | . | . |
| . | . | . | . |

As seen in Table 1B above, the drawcode can be utilized as an index or pointer into the table to determine the appropriate visual representation. Any appropriate color, width or style type may be used.

Referring to FIG. 8, at block 246 the process loops back to block 236 until each all the polyline data entities for the parcel are formed and associated with corresponding drawcodes. In a present embodiment, a parcel is organized internally to facilitate access to the data records located therein. The polyline data entities within each parcel of cartographic data are physically stored within the parcel in an order based on their associated rank and drawcode. As an example, within each parcel of cartographic data, all the polyline data entities having a drawcode of "1" are stored together, all the polyline data entities having a drawcode of "2" are stored together, and so on. (A parcel may not have polyline data entities associated with all drawcodes). At block 248, the plurality of polyline data entities are sorted into groups by their rank and, for all the polyline data entities of a given rank, by their respective drawcodes. Therefore, the polyline data entities that represent similar (or identical) types of geographic features are physically grouped together (i.e., physically adjacent to each other, in proximity to each other) within the parcel.

The order in which each group of polylines associated with each different drawcode is stored facilitates the rendering process. As an example, all the groups of polyline data entities associated with drawcodes that represent rank 0 roads may be stored first, followed by all the groups of polyline data entities associated with drawcodes that represent rank 1 roads and so on. In this manner, data entities that represent roads of higher rank are stored toward the end of the parcel relative to data entities that represent roads of lower rank. This has the result that higher ranked roads will tend to be rendered after lower ranked roads, thus allowing the higher ranked roads to be rendered more prominently. Other alternative ways for ordering the drawcode groups of polylines may be used.

As shown at block 250, the sorted plurality of data entities are stored in a computer-readable database. Thus, not only can data entities be grouped together based on the parcelization of the geographic region, the data entities can be further grouped based on the geographic features that they represent such that the data entities are sorted into spatially organized parcels and sorted by rank, and by drawcode within each rank, when stored in each parcel. As a specific example, data entities that have the same drawcode can be stored adjacent to each other in the geographic database.

Figure 9:
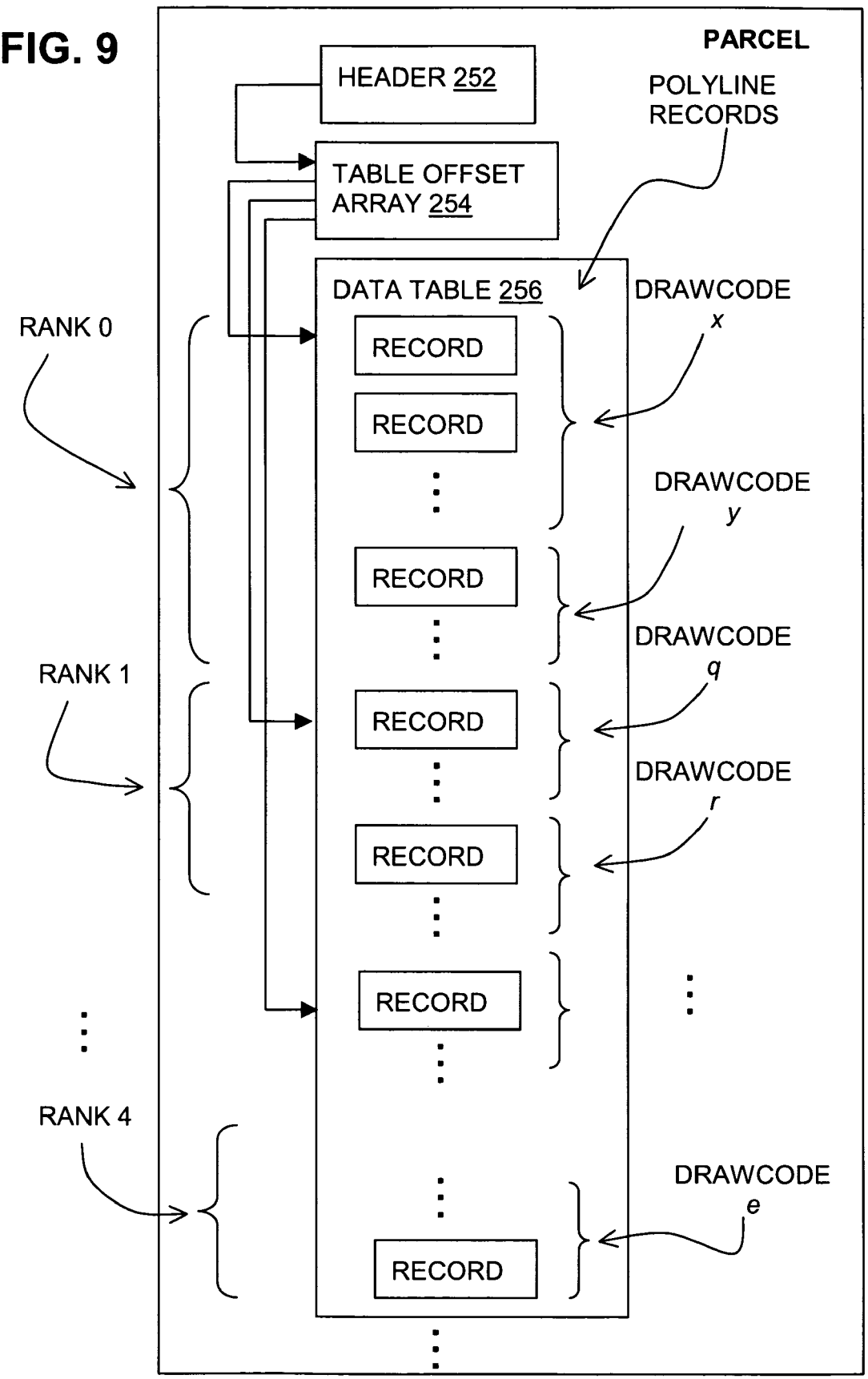
FIG. 9 is a block diagram that shows an embodiment for organizing the data contained in one of the data parcels of FIG. 6.

FIG. 9 shows a diagram of an embodiment for the internal organization of a parcel of cartographic data. In FIG. 9, the parcel includes a parcel header 252. The parcel header 252 contains some basic information about the parcel. The parcel header is formed during the compilation process. The parcel header 252 includes an offset (i.e., reference) to a table offset array 234. The table offset array 234 contains an offset to the beginning of each table, e.g., data table 236, within the parcel where data records, e.g., polyline data entities, are located. For example, if there were two tables in a parcel, the table offset array 234 would contain two entries. One entry would point to the beginning of the first table, the other entry would point to the beginning of the second table.

The polyline data entities are stored in a data table 256 in order based on rank, and within each rank, by their different drawcodes. For example, polyline data entities that represent rank 0 roads are grouped together and stored at the beginning of the table. Within this group, the data entities are further grouped by drawcode. For example, all the polyline data entities having a drawcode x are stored together, all the polyline data entities having a drawcode y are stored together, all the polyline data entities having a drawcode q are stored together, and so on. After all the polyline data entities that represent rank 0 roads are stored, all the polyline data entities that represent rank 1 roads are stored next. Again, within this group, the polyline data entities are further grouped by respective drawcode. This organization is used for all the data entities to be stored in the parcel. Following the polyline data entities, the parcel may contain other types of data.

Each parcel of cartographic data is formed and stored in a similar manner. After all the parcels of cartographic data are formed and stored, other functional types of data may be formed and stored until the entire compiled geographic database is complete.

V. Methods for Using the Geographic Database with Drawcodes to Render Images of the Geographic Features As mentioned above in connection with FIG. 2, after a compiled geographic database is produced, it is used with appropriate hardware and software to provide navigation or map related functions. One of functions provided by the compiled geographic database using appropriate hardware and software is the graphical rendering of maps. When rendering maps, different types of linearly extending geographic features, such as different types of roads, are portrayed differently, for example in different colors, widths and styles. The drawcode information can facilitate this process, as explained below.

Figure 10:
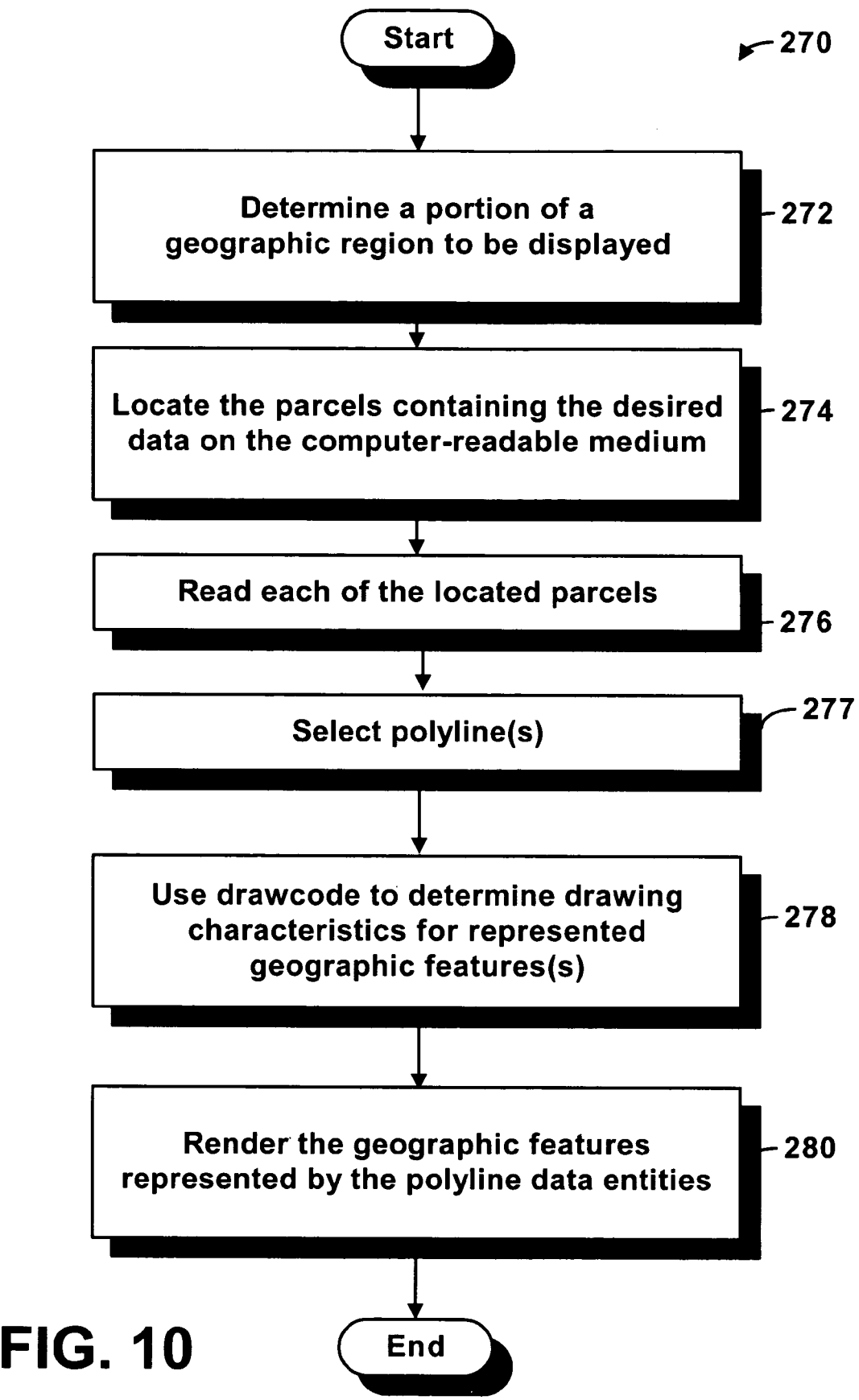
FIG. 10 is a flowchart depicting functions performed by a navigation application for rendering images of a portion of a geographic region on an associated display device using a geographic database with drawcodes.

FIG. 10 is a flow diagram illustrating a process 270 performed by a navigation application for rendering images of a portion of a geographic region on an associated display device using a geographic database. Suitable graphics tools that may be included in the system and used to render images are Unix, X-Windows, MetaWindow, WIN32, or any of a number of existing platforms supporting graphics.

Initially, as shown at block 272, the portion of a geographic region to be displayed is determined. For example, a system may receive input from a user, such as a request to display a map of a particular region. Then, as shown at block 274, the database parcel(s) containing the data corresponding to the area to be displayed are determined and located on computer-readable medium, such as the medium 212. For example, a sector of a disc may contain the desired data, and the navigation system hardware and software locate this specific sector.

Next, as shown at block 276, each parcel that has been determined to contain data necessary to render the desired image is accessed and read. As each parcel is accessed and read, the polyline data entities and associated drawcodes included in the parcel are accessed and read (Block 277). In one embodiment, within each parcel the polyline data entities are encountered in the order in which they are stored within the parcel.

As shown at block 278, the drawcodes associated with the polyline data entities contained within the parcel are used to identify the drawing characteristics for rendering the represented geographic features.

As shown at block 280, the navigation hardware and software then render the represented geographic features on an associated display. This rendering process may involve first writing data to an image buffer or may involve writing the data to the screen. This process applies for all of the polyline data entities to be rendered from a group in a parcel and for all groups to be rendered from the parcel. Thus, as an example, linearly extending geographic features represented by data entities that have the same drawcode are rendered with lines having the same color and thickness as determined by the associated drawcode.

Figure 11:
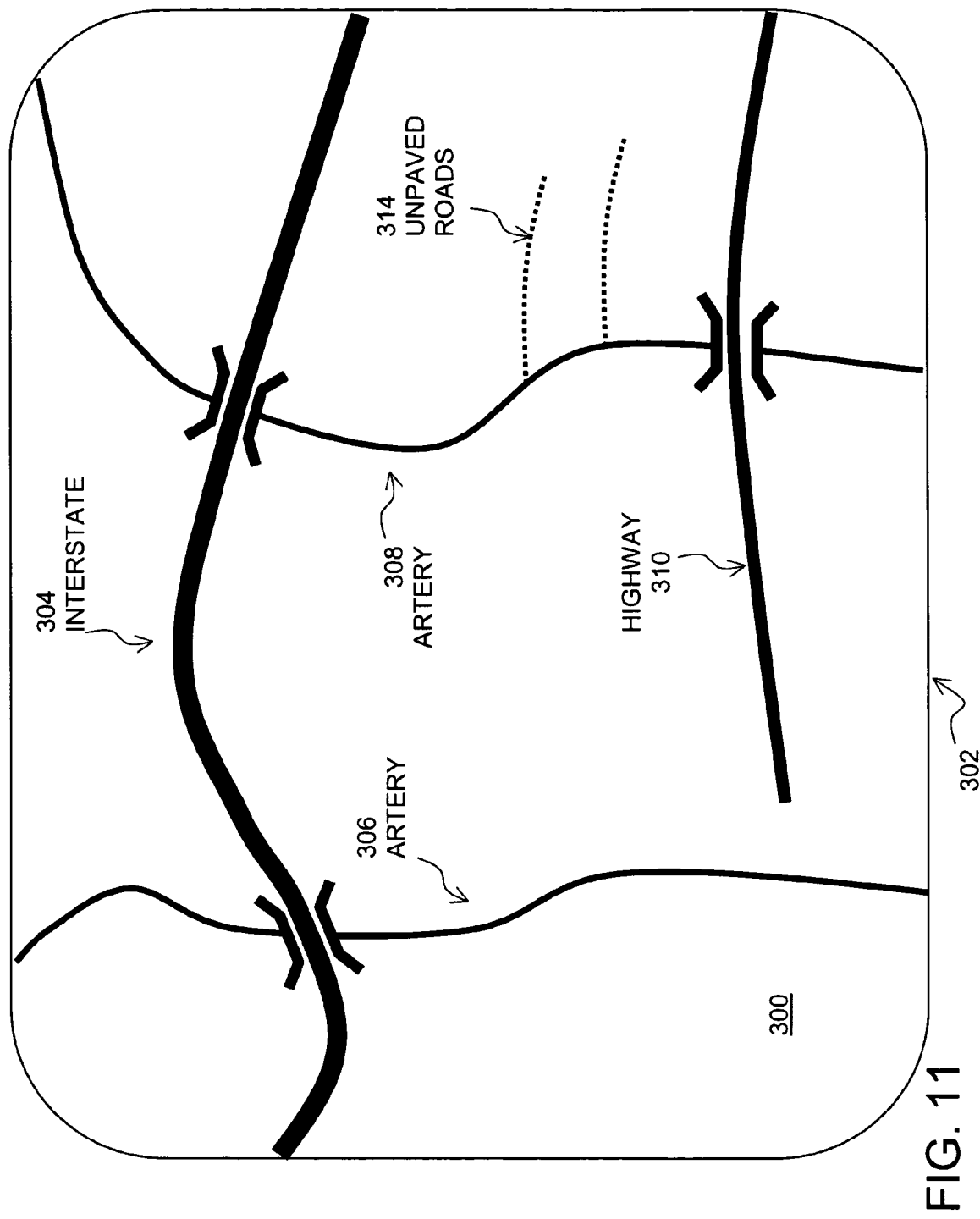
FIG. 11 illustrates an example of a representation of a geographic area on a display of a computer platform, using the process of FIG. 10.
Figure 12:
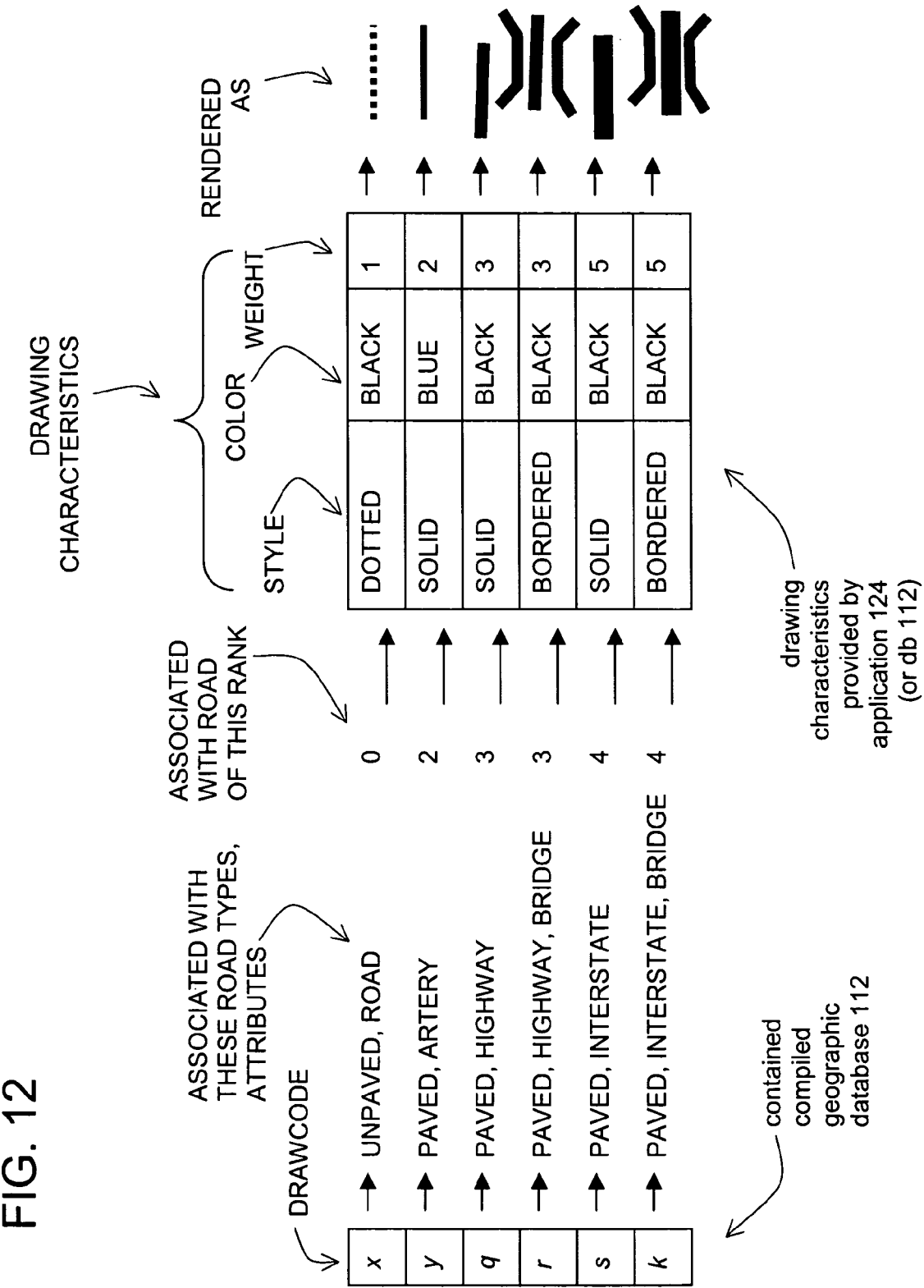
FIG. 12 graphically illustrates the relationship between the drawcode attributes associated with the data representations of geographic features and the drawing characteristics for rendering these geographic features in the example of FIG. 11.

FIGS. 11 and 12 illustrate the process of FIG. 10. FIG. 11 shows an example of a computer display 302 on which is shown a representation of a portion of a geographic region 300 that includes an interstate highway 304, arteries 306 and 308, a highway 310, and unpaved roads 314. FIG. 12 graphically illustrates the relationship between the drawcodes associated with the data representations of these roads and the rendering of the graphical images of these roads on the computer display shown in FIG. 11.

As mentioned above, in one embodiment, within each parcel of cartographic data, the polyline data entities are stored in order by rank (with the entities representing the lowest ranked roads first) and within each rank, by drawcode. Thus, referring to FIGS. 11 and 12, the polyline data entities that represent the unpaved roads 314 (with rank 0 and drawcode x) are stored and therefore rendered first, followed by the polyline data entities that represent the paved arteries 306 and 308 (with rank 2 and drawcode y), followed by the polyline data entities that represent the paved highway 310 (with rank 3 and drawcode q) and the paved highway bridge (with rank 3 and drawcode r), followed by the polyline data entities that represent the paved interstate 304 (with rank 4 and drawcode s) and the paved interstate bridge (with rank 4 and drawcode k).

Providing drawcode definitions for polyline data entities allows for an efficient rendering of geographic features. In addition, the structure of a database containing parcels of polyline data entities associated with drawcodes provides for relatively fewer disk reads to render an area. Further, it may be more efficient for some systems to render sets of graphic entities that have the same characteristics at the same time. Therefore, changing drawing characteristics a fewer number of times when rendering polylines can increase system performance.

In an alternative embodiment, drawcodes may be used for representing combinations of attributes of geographic features other than roads. For example, drawcodes may be used for representing the combinations of attributes of polygonal-shaped features (such as bodies of water, parks, golf courses, municipalities, etc.) or three-dimensional features (such as buildings). Drawcodes associated with two-dimensional or three-dimensional geographic features may be associated with drawing characteristics for rendering the two-dimensional or three-dimensional geographic features. These drawing characteristics may include border styles (e.g., color, width) and fill styles. These drawing characteristics can be included in (or referenced by) the drawcode table or provided by a navigation system application.

It is intended that the foregoing detailed description be regarded as illustrative rather than limiting, and that it is understood that the following claims including all equivalents are intended to define the scope of the invention.

What is claimed is:

1. A computer-readable medium having computer readable data structure stored thereon for representing geographic features in a geographic region, the computer readable data structure comprising:

data entities that represent geographic features located in the geographic region; and a plurality of drawcodes, wherein each drawcode represents a unique combination of attributes associated with the geographic features represented by the data entities, and wherein each of the data entities that represent the geographic features is associated with one of the drawcodes, and wherein each drawcode is associated with information that identifies drawing characteristics for rendering the geographic features represented by the data entities associated therewith.

2. The computer-readable medium of claim 1, wherein the data entities are organized on the computer-readable medium based on the drawcode of each data entity.

3. The computer-readable medium of claim 1, wherein each drawcode represents a collection of database attributes associated with the data entities.

4. The computer-readable medium of claim 1, further comprising header data that identifies the geographic region.

5. The computer-readable medium of claim 1, wherein the data entities are grouped into a plurality of parcels based on geographic location of the geographic features represented by the data entities and further wherein the data entities within each parcel are sorted by drawcode.

6. The computer-readable medium of claim 1, wherein the data entities are grouped into a plurality of parcels based on geographic location of the geographic features represented by the data entities.

7. The computer-readable medium of claim 1, wherein the data entities are organized into groups based on the drawcode of each data entity such that data entities that have the same drawcode are grouped together.

8. The computer-readable medium of claim 1, wherein the data entities are sorted on the computer-readable medium by drawcode such that data entities that have the same drawcode are stored adjacent to each other.

9. The computer-readable medium of claim 1, wherein each drawcode is associated with a unique combination of rank, road type, and road attribute associated with the data entities that represent geographic features.

10. The computer-readable medium of claim 1 wherein the geographic features represented by the data entities include roads.

11. The computer-readable medium of claim 1 wherein the geographic features represented by the data entities include 2-dimensional and 3-dimensional geographic features.

12. A method of producing a geographic database comprising:

identifying combinations of attributes associated with geographic features located in a geographic region that are in common among the geographic features;

associating drawcodes with the combinations of attributes, wherein each drawcode is associated with a distinct combination of attributes; and storing data entities in the geographic database to represent the geographic features, wherein data entities having the same drawcode are stored together in groups.

13. The method of claim 12, wherein storing the data entities comprises storing data entities having the same drawcode adjacent to each other on a computer-readable medium.

14. The method of claim 12, wherein storing data entities in the geographic database to represent the geographic features comprises storing data entities having the same drawcode adjacent to each other in the geographic database.

15. The method of claim 12, wherein storing data entities in the geographic database to represent the geographic features comprises:

sorting the data entities by drawcode; and storing the sorted data entities in the geographic database.

16. The method of claim 12, wherein storing data entities in the geographic database to represent the geographic features comprises storing the data entities in spatially organized parcels and sorted by drawcode when stored in each parcel.

17. The method of claim 12, further comprising creating a drawcode table that indicates definitions of each drawcode.

18. The method of claim 17, further comprising storing the drawcode table within a header in the geographic database.

19. The method of claim 17, wherein the drawcode table correlates drawcodes with combinations of geographic features found in the geographic region.

20. The method of claim 17, wherein the drawcode table includes information selected from the group consisting of a rank, a road type, and a road attribute.

21. The method of claim 12, wherein associating drawcodes with the combinations of attributes comprises assigning up to about 256 drawcodes.

22. The method of claim 12 wherein the geographic features represented by the data entities include roads.

23. The method of claim 12 wherein the geographic features represented by the data entities include 2-dimensional and 3-dimensional geographic features.

24. A method for storing computer readable data for representing geographic features in a geographic region, wherein the computer readable data includes a plurality of data entities, each data entity representing a geographic feature located in the geographic region, the method comprising;

associating each data entity with a drawcode, wherein each drawcode defines a distinct set of attributes associated with the geographic features;

sorting the plurality of data entities into groups by drawcode; and storing in a computer-readable database, the sorted plurality of data entities.

25. The method of claim 24, wherein associating each data entity with a drawcode comprises assigning a drawcode to each data entity.

26. The method of claim 24, wherein the drawcode represents a collection of underlying database attributes used to form a polyline.

27. The method of claim 24, wherein associating each data entity with a drawcode comprises assigning up to about 256 drawcodes.

28. The method of claim 24, wherein storing in the computer-readable database the sorted plurality of data entities comprises storing the data entities in a sequential manner based on the drawcode of each data entity.

29. The method of claim 24, wherein sorting the plurality of data entities into groups by drawcode comprises sorting the plurality of data entities in groups having data entities associated with the same drawcode adjacent to each other in the computer-readable database.

30. A computer readable medium having stored therein instructions for causing a processing unit to execute the method of claim 24.

31. The method of claim 24 wherein the geographic features represented by the data entities include roads.

32. The method of claim 24 wherein the geographic features represented by the data entities include 2-dimensional and 3-dimensional geographic features.

33. A method for displaying images of portions of a geographic region on a computer display, wherein the images portray geographic features located in the geographic region, the method comprising:

reading from a computer readable database stored on a computer readable medium a group of data entities, wherein the data entities represent the geographic features, and wherein each data entity in the group has an associated drawcode which defines a combination of attributes associated with the represented geographic feature, the drawcode being associated with information that identifies drawing characteristics for rendering the represented geographic feature; and rendering on the computer display images of the geographic features that correspond to the data entities in the group.

34. The method of claim 33, further comprising determining a portion of the geographic region to be displayed.

35. The method of claim 33, further comprising locating the group of data entities on the computer readable database.

36. The method of claim 35, wherein reading from the computer readable database stored on the computer readable medium the group of data entities comprises reading data associated with the geographic features and reading the associated drawcodes.

37. The method of claim 36, further comprising determining attributes of the geographic features represented by the data entities from the associated drawcodes.

38. The method of claim 37, wherein determining geographic features associated with the group of data entities comprises referencing a drawcode table to identify the geographic features associated with the group of data entities based on the associated drawcode of each data entity.

39. A computer readable medium having stored therein instructions for causing a processing unit to execute the method of claim 33.

40. The method of claim 33 wherein the geographic features represented by the data entities include roads.

41. The method of claim 33 wherein the geographic features represented by the data entities include 2-dimensional and 3-dimensional geographic features.

42. A system comprising:

a geographic data set stored on a computer readable medium, the geographic data set including data entities representative of geographic features in a geographic region, wherein each of the data entities is associated with one of a plurality of drawcodes, each of which represents a unique combination of attributes associated with a represented geographic feature;

a navigation application for providing navigation features to an end user; and a processor operable to access the geographic data set to read a group of data entities and to execute the navigation application to display images on a computer display, wherein geographic features represented by data entities having the same drawcode are rendered with lines having the same color and thickness.

43. The system of claim 42, further comprising a positioning system for determining a location in the geographic region, and wherein the processor accesses the geographic data set to retrieve data associated with the location.

44. The system of claim 42, further comprising a user interface coupled to the processor and operable to receive an input from a user.

45. The system of claim 42 wherein the geographic features represented by the data entities include roads.

46. The system of claim 42 wherein the geographic features represented by the data entities include 2-dimensional and 3-dimensional geographic features.

* * * * *